(12) United States Patent
Rommer et al.

(10) Patent No.: US 11,849,364 B2
(45) Date of Patent: *Dec. 19, 2023

(54) PDN AND PDU SESSION TYPE MAPPING AND CAPABILITY DISCOVERY

(71) Applicant: Telefonaktiebolaget LM Ericsson (publ), Stockholm (SE)

(72) Inventors: Stefan Rommer, Västra Frölunda (SE); Jan Backman, Kärna (SE); Qian Chen, Mölndal (SE); Göran Hall, Mölndal (SE); Åsa Larsen, Hisings Backa (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/821,838

(22) Filed: Aug. 24, 2022

(65) Prior Publication Data

US 2023/0057663 A1 Feb. 23, 2023

Related U.S. Application Data

(63) Continuation of application No. 16/756,724, filed as application No. PCT/EP2018/078467 on Oct. 17, 2018, now Pat. No. 11,432,215.

(60) Provisional application No. 62/573,333, filed on Oct. 17, 2017.

(51) Int. Cl.
*H04W 36/14* (2009.01)
*H04W 8/08* (2009.01)
*H04W 36/00* (2009.01)

(52) U.S. Cl.
CPC ............. *H04W 36/14* (2013.01); *H04W 8/08* (2013.01); *H04W 36/0022* (2013.01); *H04W 36/0033* (2013.01)

(58) Field of Classification Search
CPC ... H04W 8/08; H04W 36/14; H04W 36/0066; H04W 36/0022; H04W 36/0033; H04W 36/00; H04W 36/0011
See application file for complete search history.

(56) References Cited

U.S. PATENT DOCUMENTS

| | | | |
|---|---|---|---|
| 10,136,407 B2 | 11/2018 | Kuge et al. | |
| 10,225,768 B2 | 3/2019 | Ryu et al. | |
| 11,463,929 B2* | 10/2022 | Kim | H04W 36/0022 |
| 2008/0318575 A1 | 12/2008 | Ulupinar et al. | |
| 2013/0329565 A1 | 12/2013 | Holness et al. | |
| 2014/0024374 A1 | 1/2014 | Bergman et al. | |

(Continued)

FOREIGN PATENT DOCUMENTS

| | | |
|---|---|---|
| CN | 101453767 | 6/2009 |
| CN | 102595362 | 7/2012 |

(Continued)

OTHER PUBLICATIONS

"LTE/EPS 4G", 1674-4578 (2012)02-0062-03 (3 pages).
Secretary of SA WG2, "Draft Report of SA WG2 meeting #120", SA WG2 Meeting #120, Version 0.0.5 Draft Report, Mar. 27-31, 2017, Busan, South Korea (pp. 1-128).

(Continued)

*Primary Examiner* — Allahyar Kasraian
(74) *Attorney, Agent, or Firm* — Rothwell, Figg, Ernst & Manbeck, P.C.

(57) ABSTRACT

An Access and Mobility Management Function (AMF) adapted for taking part in handover from a 5G system (5GS) to an Evolved Packet System (EPS).

8 Claims, 7 Drawing Sheets

(56) References Cited

U.S. PATENT DOCUMENTS

| | | | |
|---|---|---|---|
| 2014/0036776 A1 | 2/2014 | Al-Shalash | |
| 2014/0341203 A1 | 11/2014 | Liu et al. | |
| 2017/0289898 A1 | 10/2017 | Youn et al. | |
| 2018/0035351 A1 | 2/2018 | Kodaypak | |
| 2018/0352448 A1* | 12/2018 | Ryu | H04W 24/02 |
| 2019/0037636 A1 | 1/2019 | Kim et al. | |
| 2019/0159157 A1 | 5/2019 | Gupta | |
| 2019/0335534 A1 | 10/2019 | Atarius et al. | |
| 2020/0146077 A1* | 5/2020 | Li | H04W 76/10 |
| 2020/0260340 A1 | 8/2020 | Jing | |
| 2020/0336961 A1 | 10/2020 | Liu | |
| 2020/0344648 A1 | 10/2020 | Kawasaki et al. | |
| 2020/0396791 A1 | 12/2020 | Kim et al. | |

FOREIGN PATENT DOCUMENTS

| | | |
|---|---|---|
| CN | 103024737 | 4/2013 |
| CN | 103548387 | 1/2014 |
| CN | 104521280 | 4/2015 |
| CN | 106304187 | 1/2017 |
| CN | 106465323 | 2/2017 |
| CN | 107018542 | 8/2017 |
| EP | 2 747 376 | 6/2014 |
| RU | 2 474 077 | 1/2013 |
| WO | 2017/032399 | 3/2017 |
| WO | 2017/078485 | 5/2017 |
| WO | 2017/142362 | 8/2017 |
| WO | 2017/167153 | 10/2017 |
| WO | 2017/171514 | 10/2017 |
| WO | 2019/139090 | 7/2019 |

OTHER PUBLICATIONS

Qualcomm Incorporated, "Packet Filter extension for Ethernet PDU session", SA WG2 Temporary Document, SA WG2 Meeting #122, S2-174458, Jun. 26-30, 2017, San Jose Del Cabo, Mexico (5 pages).

International Search Report and Written Opinion dated Mar. 28, 2019 issued in International Application No. PCT/EP2018/078467. (27 pages).

International Preliminary Report on Patentability dated Dec. 20, 2019 issued in International Application No. PCT/EP2018/078467. (13 pages).

3GPP TS 23.502 V1.2.0 (Sep. 2017); 3rd Generation Partnership Project; Technical Specification Group Services and System Aspects; Procedures for the 5G System; Stage 2 (Release 15) (Sep. 2017). (165 pages).

3GPP TS 29.303 V14.3.0 (Sep. 2017); 3rd Generation Partnership Project; Technical Specification Group Core Network and Terminals; Domain Name System Procedures; Stage 3 (Release 14) (Sep. 2017). (71 pages).

Ericsson, "Handling of Ethernet and unstructured PDU session types when interworking with EPC (23.502)", SA WG2 Meeting #123; Oct. 23-27, 2017, Ljubljana, Slovenia; S2-177739. (9 pages).

NTT Docomo, "A new annex for session parameters mapping from EPS to 5GS", SA WG2 Meeting #122, Jun. 26-30, 2017, Cabo, Mexico, S2-174565. (2 pages).

NTT Docomo, "23.502: handover from EPS to 5GS procedure using Nx interface", SA WG2 Meeting #122, Jun. 26-30, 2017, Cabo, Mexico, S2-174564. (5 pages).

3GPP TS 23.501 V1.4.0 (Sep. 2017); 3rd Generation Partnership Project; Technical Specification Group Services and System Aspects; System Architecture for the 5G System; Stage 2 (Release 15) (Sep. 2017). (151 pages). cited by applicant.

\* cited by examiner

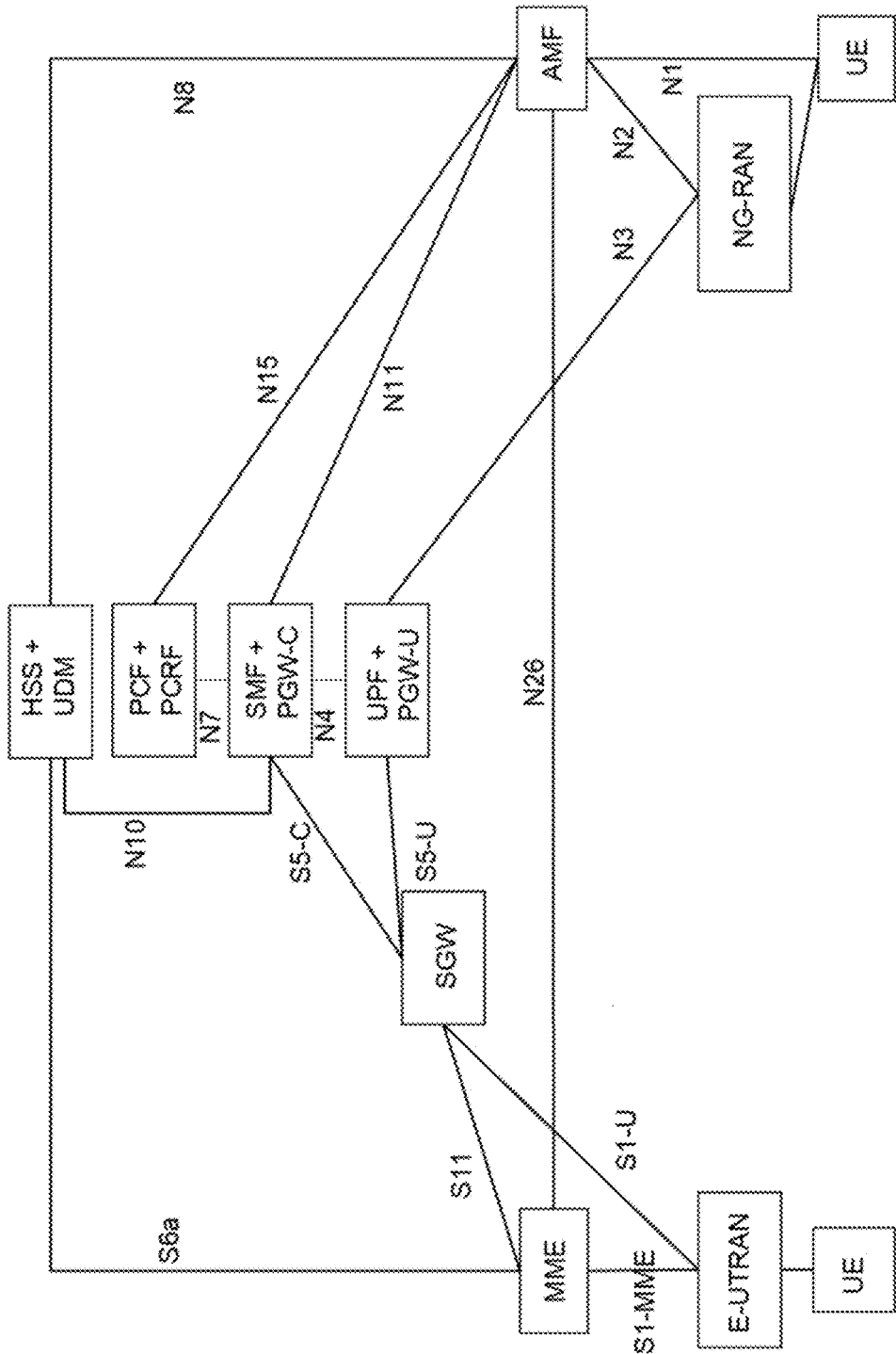
FIG. 1 – PRIOR ART

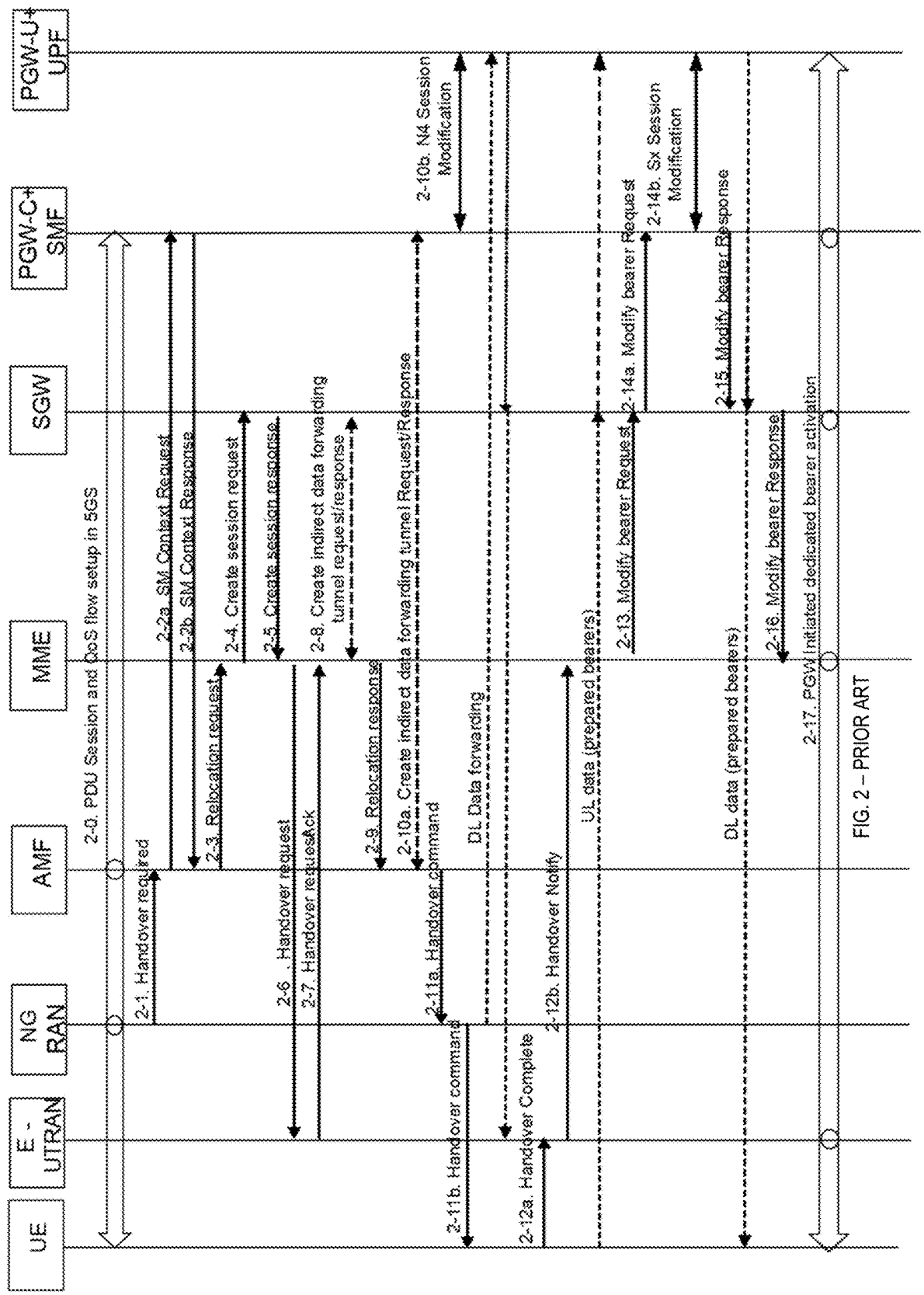
FIG. 2 – PRIOR ART

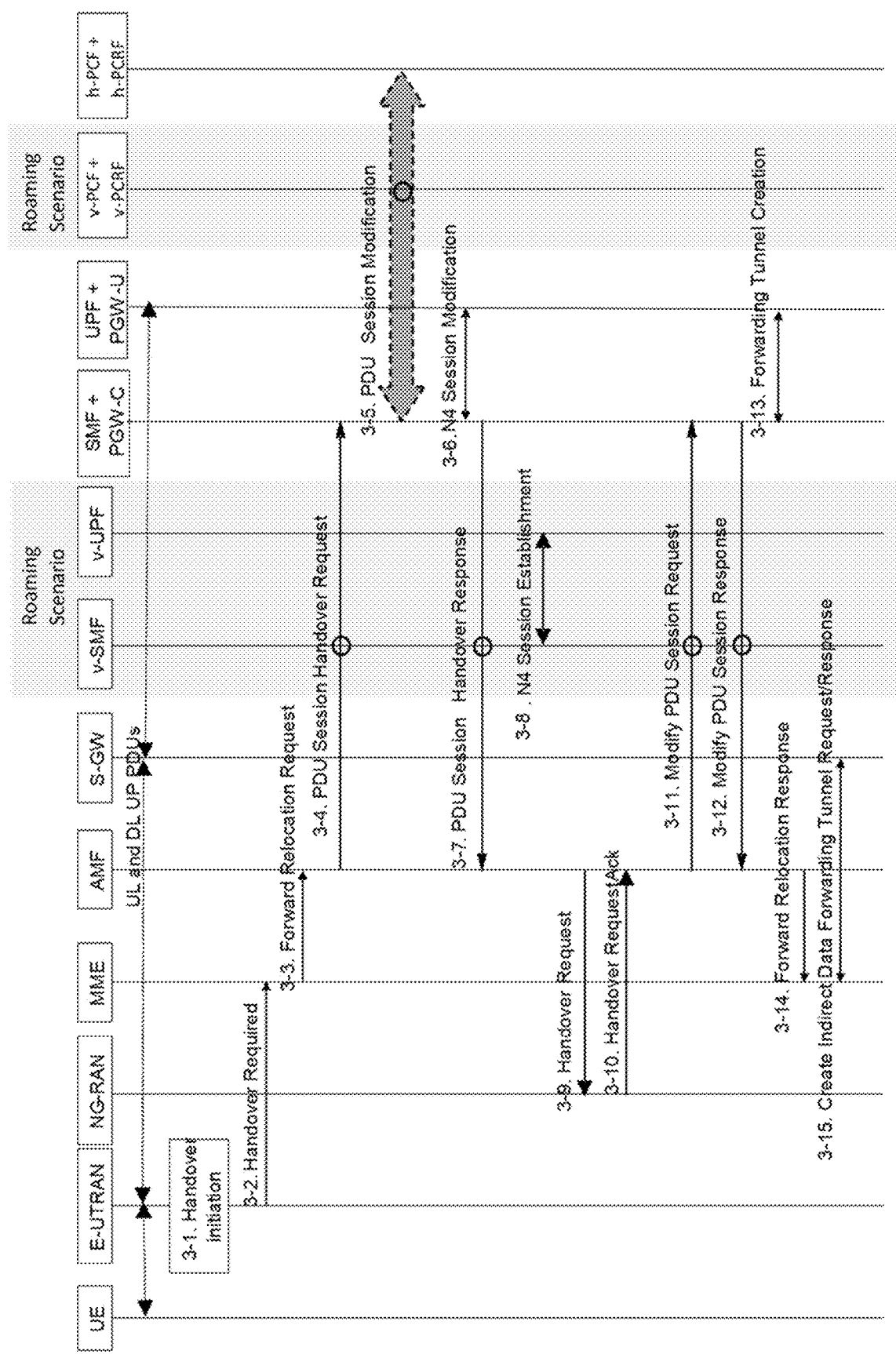
FIG. 3 – PRIOR ART

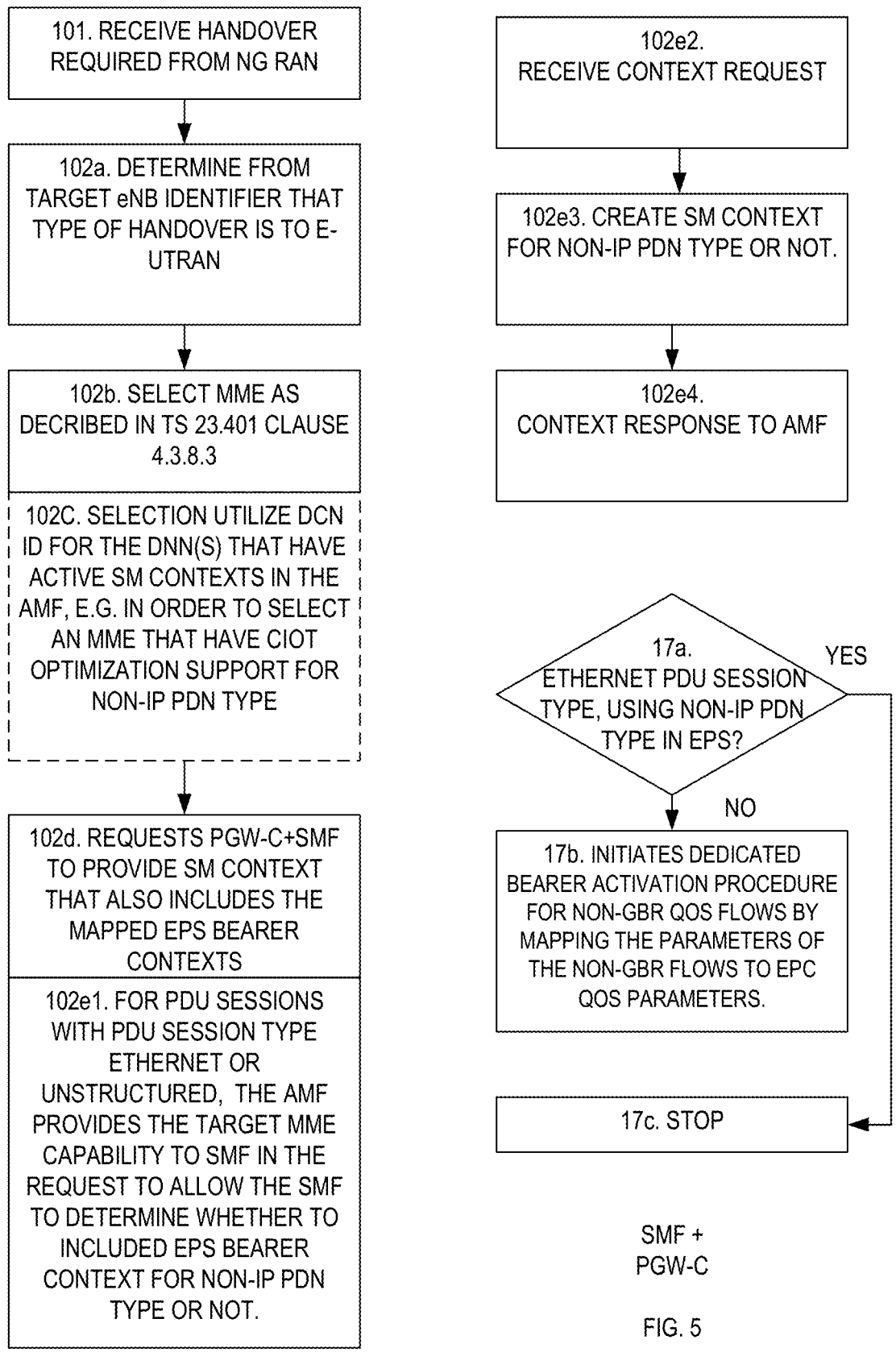

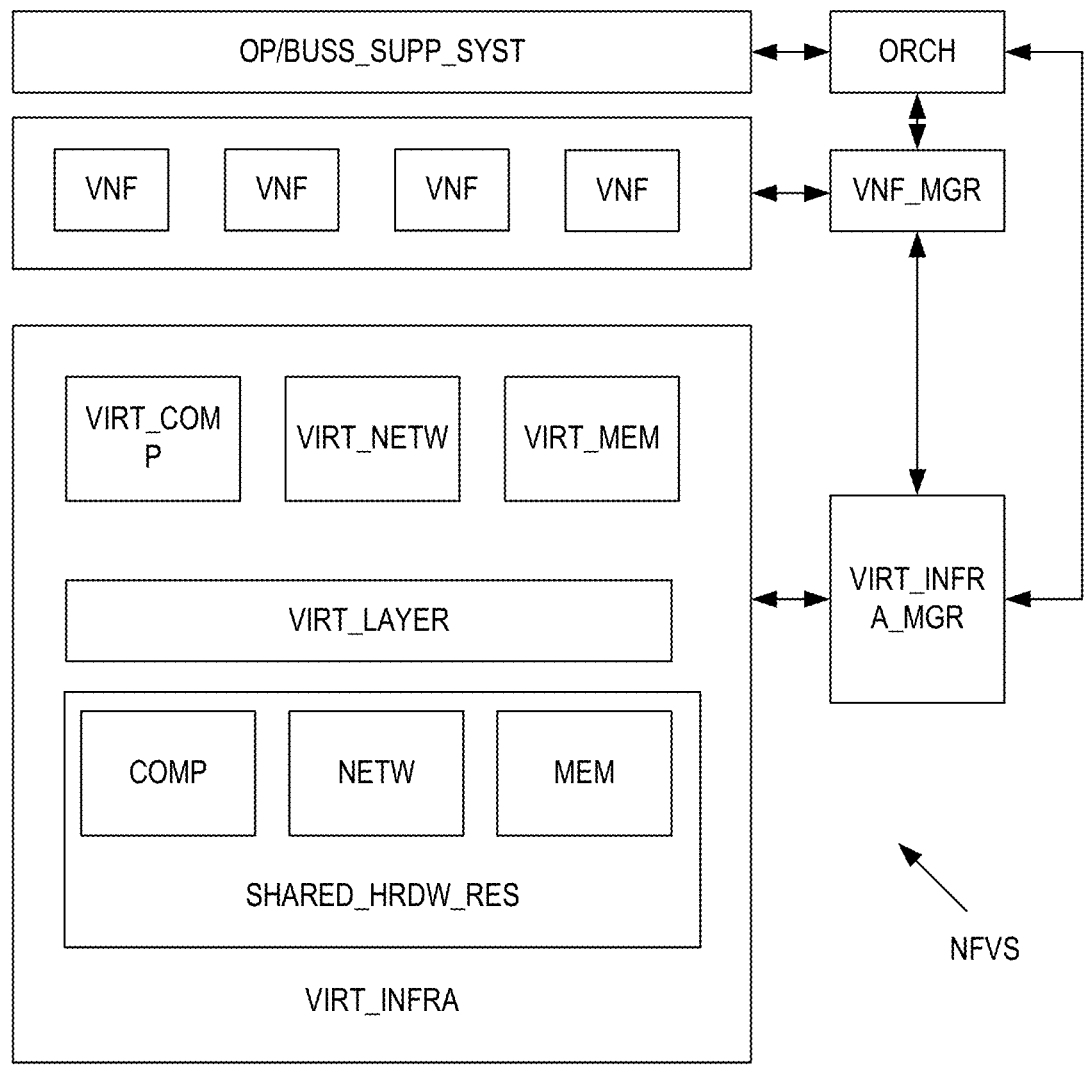
FIG. 9 – PRIOR ART

PDN AND PDU SESSION TYPE MAPPING AND CAPABILITY DISCOVERY

CROSS REFERENCE TO RELATED APPLICATIONS

This application is a continuation of U.S. application Ser. No. 16/756,724, filed on Apr. 16, 2020 (status pending), which is the 35 U.S.C. § 371 National Stage of International Patent Application No. PCT/EP2018/078467, filed Oct. 17, 2018, which claims priority to US. Provisional Patent application No. 62/573,333, filed on Oct. 17, 2017. The above identified applications are incorporated by this reference.

TECHNICAL FIELD

This invention is in general directed to methods and apparatus for interworking between Evolved Packet Core, EPC, and 5G Core, 5GC, and in particular interworking aspects for handling different Packet Data Network, PDN, and Packet Data Unit, PDU, session type mapping and capability discovery during such interworking between EPC and 5GC.

BACKGROUND

3GPP TS 23.501 v 1.4.0 and 3GPP TS 23.502 v 1.2.0 specify mobility procedures between 5th Generation Core, 5GC, and Evolved Packet Core EPC (4th Generation/Long Term Evolution, LTE, systems).

In 3GPP TS 23.501 v 1.4.0, the System Architecture for the 5G System is described. In the following some key architectural aspects shall be emphasized.

4.3 Interworking With E-UTRAN Connected to EPC

FIG. 1 corresponds to 3GPP TS 23.501 V1.4.0 FIG. 4.3.1-1: Non-roaming architecture for interworking between 5GS and EPC/E-UTRAN (Evolved UMTS Terrestrial Radio Access Network). The N26 interface is an inter-CN (Core Network) interface between the MME and 5GS AMF (Access and Mobility management Function) in order to enable interworking between EPC and the NG (Next Generation) core. Support of N26 interface in the network is optional for interworking.

5.17.2.1 General

In order to interwork with EPC, the UE that supports both 5GC and EPC NAS (Non-Access Stratum) can operate in single-registration mode or dual-registration mode:

In single-registration mode, UE has only one active MM (Mobility Management) state (either RM (Registration Management) state in 5GC or EMM (EPS Mobility Management) state in EPC) and it is either in 5GC NAS mode or in EPC NAS mode (when connected to 5GC or EPC, respectively). UE maintains a single coordinated registration for 5GC and EPC.

In dual-registration mode, UE can handle independent registrations for 5GC and EPC. In this mode, the UE may be registered to 5GC only, EPC only, or to both 5GC and EPC.

The support of single registration mode is mandatory for UEs that support both 5GC and EPC NAS.

During E-UTRAN Initial Attach, UE supporting both 5GC and EPC NAS (Non-Access Stratum), shall indicate its support of 5G NAS in UE Network Capability described in clause 5.11.3 of TS 23.401.

During registration to 5GC, UE supporting both 5GC and EPC NAS shall indicate its support of EPC NAS.

NOTE: This indication may be used to give the priority towards selection of PGW-C (Packet Data Network (PDN) Gateway–Control plane)+SMF (Session Management Function) for UEs that support both EPC and 5GC NAS.

Networks that support interworking with EPC, may support interworking procedures that use the N26 interface or interworking procedures that do not use the N26 interface. Interworking procedures with N26 support providing IP (Internet Protocol) address continuity on inter-system mobility to UEs that support 5GC NAS and EPC NAS. Networks that support interworking procedures without N26 shall support procedures to provide IP address continuity on inter-system mobility to UEs operating in both single-registration mode and dual-registration mode.

In entire clause 5.17.2 the terms "initial attach", "handover attach" and "TAU" (Traffic Area Update) for the UE (User Equipment) procedures in EPC can alternatively be combined EPS/IMSI (International Mobile Subscriber Identity) Attach and combined TA/LA (Traffic Area/Location Area) depending on the UE configuration defined in TS 23.221.

5.17.2.2 Interworking Procedures With N26 Interface

2.1.1.1.1 5.17.2.2.1 General

Interworking procedures using the N26 interface, enables the exchange of MM (Mobility Management) and SM (Session Management) states between the source and target network. Handover procedures are supported with the N26 interface. When interworking procedures with N26 is used, the UE operates in single-registration mode. The network keeps only one valid MM state for the UE, either in the AMF or MME (Mobility Management Entity). Either the AMF or the MME is registered in the HSS+UDM.

The support for N26 interface between AMF in 5GC and MME in EPC is required to enable seamless session continuity (e.g. for voice services) for inter-system change.

NOTE: When applying the AMF planned removal procedure or the procedure to handle AMF failures (see clause 5.21.2) implementations are expected to update the DNS (Domain Name System) configuration to enable MMEs to discover alternative AMFs if the MME tries to retrieve a UE context from an AMF that has been taken out of service or has failed. This addresses the scenario of UEs performing 5GC to EPC Idle mode mobility and presenting a mapped GUTI (Global Unique Temporary Identifier) pointing to an AMF that has been taken out of service or has failed.

2.1.1.1.2 5.17.2.2.2 Mobility for UEs in Single-Registration Mode

When the UE supports single-registration mode and network supports interworking procedure with the N26 interface:

For idle-mode mobility from 5GC to EPC, the UE performs TAU procedure with EPS GUTI mapped from 5G-GUTI sent as old Native GUTI. The MME retrieves the UE's MM and SM context from 5GC if the UE has a PDU session established or if the UE or the EPC support "attach without PDN connectivity". The UE performs an attach procedure if the UE is registered without PDU session in 5GC and the UE or the EPC does not support attach without PDN connectivity. For connected-mode mobility from 5GC to EPC, inter-system handover is performed. During the TAU or Attach procedure the HSS+UDM (Home Subscriber Server+Unified Data Management) cancels any AMF registration.

For idle-mode mobility from EPC to 5GC, the UE performs registration procedure with the EPS GUTI sent as the old GUTI. The AMF and SMF retrieve the UE's MM and SM context from EPC. For connected-mode mobility from EPC to 5GC, inter-system handover is performed. During the Registration procedure, the HSS+UDM cancels any MME registration.

In 3GPP TS 23.502 V1.2.0, procedures for the 5G System have been specified. In the following key aspects of EPC/5GC aspects have been emphasized.

4.11 System Interworking Procedures with EPS

4.11.1 N26 Based Interworking Procedures

4.11.1.1 General

N26 interface is used to provide seamless session continuity for single registration mode.

4.11.2 Handover Procedures for Single-Registration Mode

4.11.2.1 5GS to EPS Handover Using N26 Interface

FIG. 2, corresponding to FIG. 4.11.2.1-1, TS 23.502, describes the handover procedure for single-registration mode from 5GS to EPS when N26 is supported.

During the handover procedure, as specified in clause 4.9.1.2.1, the source AMF shall reject any SMF+PGW-C initiated N2 request received since handover procedure started and shall include an indication that the request has been temporarily rejected due to handover procedure in progress.

Upon reception of a rejection for a SMF+PGW-C initiated N2 request(s) with an indication that the request has been temporarily rejected due to handover procedure in progress, the SMF+PGW-C behaves as specified in clause 4.9.1.2.1.

The procedure involves a handover to EPC and setup of default EPS bearer and dedicated bearers for GBR QoS flows in EPC in steps 1-16 and re-activation, if required, of dedicated EPS bearers for non-GBR QoS flows in step 17. This procedure can be triggered, for example, due to new radio conditions, load balancing or due to specific service e.g. in the presence of QoS Flow for voice, the source NG-RAN node may trigger handover to EPC.

UE has one or more ongoing PDU Sessions each including one or more QoS flows. During PDU Session establishment and GBR QoS flow establishment, PGW-C+SMF performs EPS QoS mappings and allocates TFT with the PCC rules obtained from the PCF+PCRF if PCC is deployed, otherwise EPS QoS mappings and TFT allocation are executed by the PGW-C+SMF locally. EPS Bearer IDs are allocated by the serving AMF requested by the SMF if the SMF determines that EPS bearer ID(s) needs to be assigned to the QoS flow(s). For each PDU Session, EPS bearer ID(s) are allocated to the default EPS bearer which non GBR flows are mapped to and allocated to dedicated bearers which the GBR flows that are mapped to in EPC. The EPS Bearer ID(s) for these bearers are provided to the UE and PGW-C+SMF by AMF. The UE is also provided with the mapped QoS parameters. The mapped EPS QoS parameters may be provided to PGW-C+SMF by the PCF+PCRF, if PCC is deployed.

2-1. NG-RAN decides that the UE should be handed over to the E-UTRAN. The NG-RAN sends a Handover Required (Target eNB ID, Source to Target Transparent Container) message to the AMF.

2-2. The AMF determines from the 'Target eNB Identifier' IE that the type of handover is Handover to E-UTRAN. The AMF requests the PGW-C+SMF to provide SM Context that also includes the mapped EPS Bearer Contexts. This step is performed with all PGW-C+SMFs allocated to the UE.

This step should be aligned with intra 5GC inter-AMF handover.

NOTE: In roaming scenario, the UE's SM EPS Contexts are obtained from the V-SMF.

2-3. The AMF selects an MME and sends a Relocation Request (Target E-UT-RAN Node ID, Source to Target Transparent Container, mapped MM and SM EPS UE Context (default and dedicated GBR bearers)) message. The SGW address and Tunnel endpoint Identifier, TEID, for both the control-plane or EPS bearers in the message are such that target MME selects a new SGW.

2-4. The MME selects the Serving GW and sends a Create Session Request message for each PDN connection to the Serving GW.

2-5. The Serving GW allocates its local resources and returns them in a Create Session Response message to the MME.

2-6. The MME requests the target eNodeB to establish the bearer(s) by sending the message Handover Request message. This message also contains a list of EPS Bearer IDs that need to be setup.

2-7. The target eNB allocates the requested resources and returns the applicable parameters to the target MME in the message Handover Request Acknowledge (Target to Source Transparent Container, EPS Bearers setup list, EPS Bearers failed to setup list).

2-8. If the MME decides that indirect forwarding applies, it sends a Create Indirect Data Forwarding Tunnel Request message (Target eNB Address, TEID(s) for DL data forwarding) to the Serving GW. The Serving GW returns a Create Indirect Data Forwarding Tunnel Response (Cause, Serving GW Address(es) and Serving GW DL TEID(s) for data forwarding) message to the target MME.

2-9. The MME sends the message Relocation Response (Cause, List of Set Up RABs, EPS Bearers setup list, MME Tunnel Endpoint Identifier for Control Plane, RAN Cause, MME Address for Control Plane, Target to Source Transparent Container, Address(es) and TEID(s) for Data Forwarding).

2-10. If indirect forwarding applies, the AMF forwards to the PGW-C+SMF the information related to data forwarding to the SGW. The PGW-C+SMF returns a Create Indirect Data Forwarding Tunnel Response.

2-11. The AMF sends the Handover Command to the source NG-RAN. The source NG-RAN commands the UE to handover to the target access network by sending the HO Command. This message includes a transparent container including radio aspect parameters that the target eNB has set-up in the preparation phase. The UE correlates the ongoing QoS flows with the indicated EPS Bearer IDs to be setup in the HO command. UE locally deletes the QoS flows that do not have an EPS bearer ID assigned.

2-12. When the UE has successfully accessed the target eNodeB, the target eNodeB informs the target MME by sending the message Handover Notify.

2-13. The target MME informs the Serving GW that the MME is responsible for all the bearers the UE have established by sending the Modify Bearer Request message for each PDN connection.

The target MME releases the non-accepted EPS Bearer contexts by triggering the Bearer Context deactivation procedure. If the Serving GW receives a DL packet for a non-accepted bearer, the Serving GW drops the DL (Downlink) packet and does not send a Downlink Data Notification to the SGSN.

2-14. The Serving GW informs the PGW-C+SMF of the relocation by sending the Modify Bearer Request message for each PDN connection. The PGW locally deletes the QoS flows that do not have an EPS bearer ID assigned. Due to the "match all" filter in the default QoS flow, the PGW maps the IP flows of the deleted QoS flows to the default QoS flow.

2-15. The PGW-C+SMF acknowledges the Modify Bearer Request. At this stage the User Plane path is established for the default bearer and the dedicated GBR bearers between the UE, target eNodeB, Serving GW and the PGW+SMF.

2-16. The Serving GW acknowledges the User Plane switch to the MME via the message Modify Bearer Response.

2-17. The PGW-C+SMF initiates dedicated bearer activation procedure for non-GBR QoS flows by mapping the parameters of the non-GBR flows to EPC QoS parameters. This setup may be triggered by the PCRF+PCF which may also provide the mapped QoS parameters, if PCC is deployed. This procedure is specified in TS 23.401 [13], clause 5.4.1.

4.11.2.2 EPS to 5GS Handover Using N26 Interface

4.11.2.2.1 General

N26 interface is used to provide seamless session continuity for single registration mode. FIG. 3 corresponding to TS 23.502 V1.2.0 (2017-09) FIG. 4.11.2.2.2-1 describes the handover procedure from EPS to 5GS when N26 is supported.

SUMMARY

In 5GC, the PDU session types "Ethernet" and "Unstructured" are introduced. In EPC, PDN type "Non-IP" is defined. However, how these types are used during inter-RAT mobility is not specified in current TS.

Also, due to the mobility and session management separation in 5GC, the SMF which performs conversion between PDU session (with QoS flows) and PDN connection (with bearers) is not aware of the "Non-IP" supporting capability of the EPC.

It is a first object to set forth apparatuses and methods that provides for enhanced operation for handover between 5GS and EPS and vice versa.

This and other objects have been achieved by a system comprising an Access and Mobility Management Function, AMF, adapted for taking part in handover from a 5G system, 5GS, to an Evolved Packet System, EPS, an interface being provided between a Mobility Management Entity, MME, of the EPS and the AMF, the system moreover comprising a Session Management Function and Packet Data Network (PDN) Gateway—Control plane and Session Management Function, SMF and PGW C, entity.

The AMF being adapted for signalling with a Session Management Function and Packet Data Network, PDN, Gateway-Control plane, SMF and PGW-C, entity.

The AMF being adapted for providing a request to the SMF and PGW-C entity to provide a Session Management, SM, Context that also includes mapped EPS, Bearer Contexts. For PDU Sessions with PDU Session type Ethernet or Unstructured, providing a capability of a target MME of supporting a Non-IP PDN type to the PGW-C and SMF entity in the request to allow the PGW-C and SMF entity to determine whether to include an EPS Bearer context for non-IP PDN type—transmitting the request to the SMF.

The SMF and PGW-C entity being adapted for receiving a Context Request; —for PDU sessions with PDU Session type Ethernet or Unstructured, determining to include an EPS Bearer context for non-IP PDN type and creating a Session Management, SM, Context; —transmitting a Context Response to the AMF with the SM Context.

The above object has also been achieved by an Access and Mobility Management Function, AMF, adapted for taking part in handover from a 5G system, 5GS, to an Evolved Packet System, EPS, an interface being provided between a Mobility Management Entity, MME, of the EPS and the AMF. The AMF being adapted for signalling with a Session Management Function and Packet Data Network, PDN, Gateway—Control plane, SMF and PGW-C, entity, the AMF being adapted for—providing a request to the SMF and PGW-C entity to provide a Session Management, SM, Context that also includes mapped EPS, Bearer Contexts;

wherein for PDU Sessions with PDU Session type Ethernet or Unstructured, providing a capability of a target MME of supporting a Non-IP PDN type to the PGW-C and SMF entity in the request to allow the PGW-C and SMF entity to determine whether to include an EPS Bearer context for non-IP PDN type; —transmitting the request to the SMF.

The above object has also been achieved by an Session Management Function and Packet Data Network Gateway—Control plane and Session Management Function, SMF and PGW-C, entity, adapted for taking part in handover from a 5G system, 5GS, to an Evolved Packet System, EPS, an interface being provided between a Mobility Management Entity, MME, of the EPS, and an Access and Mobility Management Function, AMF, of the 5GS. The SMF and PGW-C entity being adapted for—receiving a Context Request; —for PDU sessions with PDU Session type Ethernet or Unstructured, determining to include an EPS Bearer context for non-IP PDN type and creating a Session Management, SM, Context; —transmitting a Context Response to the AMF with the SM Context.

The above object has also been achieved by a Session Management Function and Packet Data Network, PDN, Gateway—Control plane and Session Management Function, SMF and PGW-C entity, adapted for taking part in handover from an Evolved Packet System, EPS to a 5G system, 5GS, in cases where an interface between an Access and Mobility Management Function, AMF, and the SMF and PGW-C entity is provided. The SMF and PGW-C entity being further adapted for—determining whether—PDN connection in EPS is NON-IP and is locally associated in SMF to PDU session type Ethernet or Unstructured; —upon a positive determination that a PDN connection in EPS is NON-IP and is locally associated in SMF to PDU session type Ethernet, setting session type in 5GS to Ethernet; —upon a negative determination that a PDN connection in EPS is NON-IP and is locally associated in SMF to PDU session type Unstructured, setting session type in 5GS to Unstructured.

The above objects have further been achieved by corresponding methods and also programs for computer and computer program products, having instructions corresponding to the method steps achieve the objects set out.

According to embodiments of the invention
1) "Ethernet" and "Unstructured" PDU types shall be mapped to "Non-IP" PDN type.
2) AMF shall transfer the "Non-IP" support capability info at EPC to SMF. Moreover, SMF shall act up the capability differently when formulating the "PDN connection" info to EPC side.

Note: the logic above can be applied to both idle mode and connected mode mobility procedures during inter 5GC and EPC mobility.

BRIEF DESCRIPTION OF THE DRAWINGS

FIG. 1 shows a known reference architecture.
FIG. 2 shows an exemplary signalling flow according to the prior art concerning handover from 5GS to EPS.
FIG. 3 shows an exemplary signalling flow according to the prior art concerning handover from EPS to 5GS.
FIGS. 4 and 5 show an embodiment related to FIG. 2.
FIG. 9 shows an alternative implementation.

DETAILED DESCRIPTION

Figures 6, 7:
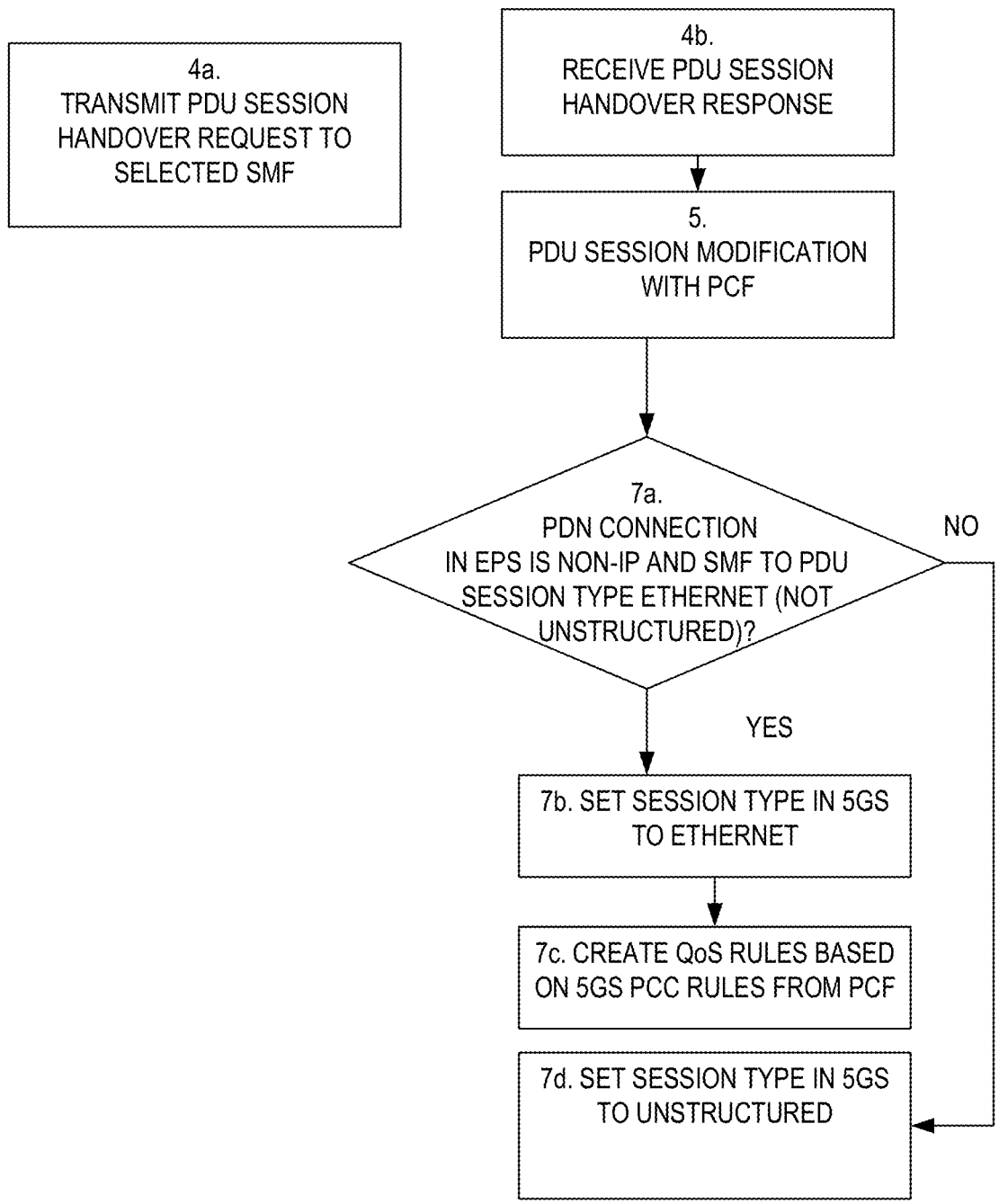
FIGS. 6 and 7 show an embodiment related to FIG. 3.

A question that has been brought to the SA2 discussion is how to handle Ethernet and Unstructured PDU types in case of EPC interworking. In EPC there are no such PDN types, and the only PDN types supported are IPv4, IPv6, IPv4v6 and non-IP.

There are several alternatives for how to handle Ethernet PDU Sessions and Unstructured PDU Sessions:

Option 1) Not supported over EPC, i.e. terminate these PDU Sessions when the UE moves to EPS
Option 2) Ethernet PDN type is introduced over EPC, unstructured PDU type maps to "non-IP" PDN type
Option 3) Ethernet and unstructured PDU types are mapped to non-IP PDN type in EPC
Option 4) Ethernet PDN type and Unstructured PDN type are introduced over EPC A benefit with mapping to non-IP in EPC (i.e. option 3) is that there is e.g. no need to impact MME, SGW, and no need to update EPC interfaces such as S6a, S11, S5

Supporting and Non-Supporting MMEs

One issue with both options 2 and 3 is how to handle MMEs not supporting non-IP (non-Internet Protocol) PDN type. For option 3 there is additionally an issue on how to handle MMEs not supporting Ethernet PDN type.

Many of these aspects around non-supporting MMEs have been addressed in EPC specifications when CIoT (Cellular Internet of Things) was introduced and those solutions could be re-used also for the Interworking, IWK, scenario. For example, in CONNECTED mode handover from 5GS to EPS, the source node (AMF in IWK case, MME in case of inter-MME handover) is assumed to know the capabilities of the target MME, e.g. based on configuration or based on MME discovery using DNS (e.g. using a specific Dedicated Core Network Identity, DCN ID, for MMEs with non-IP support). In case of IDLE mode mobility, the target MME will notify the source node (AMF in IWK case) about its capabilities for CIoT Optimization. Based on this, the bearer contexts provided to the target MME can be adjusted to either include the non-IP (or Ethernet) bearer contexts or not include it.

MME Selection

One issue (common to options 2 and 3) for Handover procedure from 5GS to EPS is that AMF is not aware of whether Ethernet or Unstructured PDU types are used in 5GS. When the AMF is selecting target MME it will thus not be able to make an informed selection between MME supporting or not supporting non-IP PDN type (or Ethernet PDN type in case of option 3). There are different options for how to handle this:

Alt 1: To be on the safe side, AMF could always try to select an MME supporting non-IP PDN types (or Ethernet PDN type in case of option 3). The drawback is that MMEs supporting non-IP PDN type (or Ethernet PDN type) would always be preferred even if it does not make sense.

Alt 2: Alternatively, the SMF indicates to AMF in the SM Context Response that non-IP support is needed. The AMF uses this indication to e.g. select MME with a DCN ID.

Alt 3: Another option is that the AMF is configured with a Dedicated Core Network Identity, DCN ID, per Data Network Name, DNN, and uses this DCN ID when selecting MME based on the active SM contexts in AMF. This assumes that the operator has configured a specific DCN ID for MMEs supporting non-IP PDN type, as e.g. described in TS 29.303. The DCN ID can either be preconfigured per DNN in AMF (will not work in roaming cases) or be provided as part of the profile from UDM.

Alt 4: A trial-and-error approach is also possible. The AMF selects target MME without taking any special considerations of whether non-IP support is needed. When the AMF then forwards the EPS Bearer context (received from SMF), the target MME will indicate in the reply what bearers are non-accepted. Removal of these bearers will then be done by the target MME using the normal handling of non-accepted resources. This approach is simple but has a higher risk of service disruption in case there are many MMEs not supporting non-IP PDN type.

In Alt 1 and 3, the AMF can select MME before requesting SM context from SMF and provide information about the MME capability to the SMF. This would allow the SMF to either include EPS Bearer contexts for the non-IP PDN type or not. In Alt 2, the AMF may request new SM Context information from SMF if no supporting MME is found, or the SMF may indicate as part of the SM Context information what part of the SM context is requiring that the target side supports non-IP PDN type allowing the AMF to remove that part of the context before forwarding to a non-supporting MME.

QoS Differentiation of Ethernet PDU Sessions

There is no support of QoS differentiation for non-IP PDN type in E'PS. Therefore, with option 2, any QoS differentiation done in 5GS for Ethernet PDU type will need to be mapped to the default bearer in EPS. This mapping would be done by the SMF when creating the SM Context for handover to EPS, i.e. for Ethernet PDU type the SMF always maps everything to the default bearer. Since it has been agreed for IWK that only the GBR bearer context is provided in the SM Context from SMF to MME (via AMF), this mapping will only have an impact in case there are GBR flows established for the Ethernet PDU Session. All non-GBR QoS flows requiring dedicated bearers in EPS are anyway assumed to be re-established on the target side after the handover (for PDU type IPv4 or IPv6). In case of Ethernet PDU type mapped to non-IP PDN Session (option 2), this simply means that these non-GBR QoS flows will instead be mapped to the default bearer after the handover and no establishment of dedicated non-GBR bearers will be triggered after handover.

First Connection in EPS

One issue with option 2 is how to establish an Ethernet session if the UE requests initial PDN connection Establishment in EPS. Different alternatives are possible:

Alt 1: A specific APN/DNN is used that is locally configured in UE and SMF/PGW to be of PDU type Ethernet. When requesting the PDN Connection in EPS the UE requests non-IP PDN type for this APN, i.e. the UE and SMF/PGW maps this APN/DNN to PDN type non-IP when in EPS, in the same way as when moving from 5GC to EPC.

Alt 2: Another possibility is to request PDN type non-IP but add an explicit indication in PCO that the PDN Connection is Ethernet PDU type. This option does not provide much benefits compared to Alt 1 except that the UE and NW handshake the Ethernet PDU type.

Alt 1 is simplest and does not require standards updates. According to the invention, Alt 1 is used.

According to aspects of the invention it is provided that apparatuses, systems and methods based on TS 23.502 are modified in the following manner:

4.11.2 Handover Procedures for SINGLE-REGISTRATION MODE

4.11.2.1 5GS to EPS Handover Using N26 Interface

FIG. 2 (FIG. 4.11.2.1-1) describes the handover procedure from 5GS to EPS when N26 is supported.

During the handover procedure, as specified in clause 4.9.1.2.1, the source AMF shall reject any SMF+PGW-C initiated N2 request received since handover procedure started and shall include an indication that the request has been temporarily rejected due to handover procedure in progress.

Upon reception of a rejection for a SMF+PGW-C initiated N2 request(s) with an indication that the request has been temporarily rejected due to handover procedure in progress, the SMF+PGW-C behaves as specified in clause 4.9.1.2.1.

FIGS. 4 and 5, which should be read in conjunction with FIG. 2, illustrate aspects of the invention. Some steps of the prior art methods, in particular those which are identical with embodiments of the invention, have been omitted from FIGS. 4 and 5.

The procedure involves a handover to EPC and setup of default EPS bearer and dedicated bearers for GBR QoS flows in EPC in steps 1-16 and re-activation, if required, of dedicated EPS bearers for non-GBR QoS flows in step 17. This procedure can be triggered, for example, due to new radio conditions, load balancing or due to specific service e.g. in the presence of QoS Flow for voice, the source NG-RAN node may trigger handover to EPC.

For Ethernet and Unstructured PDU Session types, the PDN type non-IP is used in EPS. The SMF shall thus set the PDN Type of the EPS Bearer Context to non-IP in these cases. After the handover to EPS, the PDN Connection will have PDN type non-IP, but it shall be locally associated in UE and SMF to PDU Session type Ethernet or Unstructured respectively.

UE has one or more ongoing PDU Sessions each including one or more QoS flows. During PDU Session establishment and GBR QoS flow establishment, PGW-C+SMF performs EPS QoS mappings and allocates TFT with the PCC rules obtained from the PCF+PCRF if PCC is deployed, otherwise EPS QoS mappings and TFT allocation are executed by the PGW-C+SMF locally. EPS Bearer IDs are allocated by the serving AMF requested by the SMF if the SMF determines that EPS bearer ID(s) needs to be assigned to the QoS flow(s). For each PDU Session, EPS bearer ID(s) are allocated to the default EPS bearer which non GRB flows are mapped to and allocated to dedicated bearers which the GBR flows that are mapped to in EPC. For Ethernet and Unstructured PDU Session types, only EPS Bearer ID for the default bearer is allocated. The EPS Bearer ID(s) for these bearers are provided to the UE and PGW-C+SMF by AMF. The UE is also provided with the mapped QoS parameters. The mapped EPS QoS parameters may be provided to PGW-C+SMF by the PCF+PCRF, if PCC is deployed.

2-1. NG-RAN decides that the UE should be handed over to the E-UTRAN. The NG-RAN sends a Handover Required (Target eNB ID, Source to Target Transparent Container) message to the AMF, 101.

2-2. The AMF determines, 102*a*, from the 'Target eNB Identifier' IE that the type of handover is Handover to E-UTRAN. The AMF selects, 102*b*, an MME as described in TS 23.401 clause 4.3.8.3. The selection of MME may utilize, 102*c*, a DCN, Dedicated Core Networks, ID for the DNN(s) that have active SM contexts in the AMF, e.g. in order to select an MME that have Cellular Internet of Things, CIoT, Optimization support for non-IP PDN type.

3GPP TS 23.401 v 15.1.0, 2017-09-18, 4.3.8.3 reads a.o. that the MME selection function selects an available MME for serving a UE. The selection is based on network topology, i.e. the selected MME serves the UE's location and for overlapping MME service areas, the selection may prefer MMEs with service areas that reduce the probability of changing the MME. When a MME/SGSN selects a target MME, the selection function performs a simple load balancing between the possible target MMEs. In networks that deploy dedicated MMEs/SGSNs for UEs configured for low access priority, the possible target MME selected by source MME/SGSN is typically restricted to MMEs with the same dedication.

When DCNs are deployed, to maintain a UE in the same DCN when the UE enters a new MME pool area, the eNodeB's NNSF should have configuration that selects, based on the MMEGIs or NRIs of neighbouring pool areas, a connected MME from the same DCN. Alternately, for PLMN wide inter-pool intra-RAT mobility, the operator may divide up the entire MMEGI and NRI value space into non-overlapping sets with each set allocated to a particular DCN. In this case all eNodeBs may be configured with the same MME selection configuration. If UE assisted DCN selection feature is supported and a DCN-ID is provided by the UE, the DCN-ID shall be used in the eNodeB for MME selection to maintain the same DCN when the serving MME is not available.

The AMF requests, 102*d*, the PGW-C+SMF to provide SM Context that also includes the mapped EPS Bearer Contexts. For PDU Sessions with PDU Session type Ethernet or Unstructured, the SMF, 102e2, creates SM Context for non-IP PDN type. The AMF, 102e1, provides the target MME capability to SMF in the request to allow the SMF to determine, 102e3, whether to include EPS Bearer context for non-IP PDN type or not. This step is performed with all PGW-C+SMFs allocated to the UE. The context response is transmitted to AMF, 102e4.

This step should be aligned with intra 5GC inter-AMF handover.

2-3. The AMF sends a Relocation Request (Target E-UTRAN Node ID, Source to Target Transparent Container, mapped MM and SM EPS UE Context (default and dedicated GBR bearers)) message. The SGW address and TEID for both the control-plane or EPS bearers in the message are such that target MME selects a new SGW.

2-4. The MME selects the Serving GW and sends a Create Session Request message for each PDN connection to the Serving GW.

2-5. The Serving GW allocates its local resources and returns them in a Create Session Response message to the MME.

2-6. The MME requests the target eNodeB to establish the bearer(s) by sending the message Handover Request message. This message also contains a list of EPS Bearer IDs that need to be setup.

2-7. The target eNB allocates the requested resources and returns the applicable parameters to the target MME in the message Handover Request Acknowledge (Target to Source Transparent Container, EPS Bearers setup list, EPS Bearers failed to setup list).

2-8. If the MME decides that indirect forwarding applies, it sends a Create Indirect Data Forwarding Tunnel Request message (Target eNB Address, TEID(s) for DL data forwarding) to the Serving GW. The Serving GW returns a Create Indirect Data Forwarding Tunnel Response (Cause, Serving GW Address(es) and Serving GW DL TEID(s) for data forwarding) message to the target MME.

2-9. The MME sends the message Relocation Response (Cause, List of Set Up RABs, EPS Bearers setup list, MME Tunnel Endpoint Identifier for Control Plane, RAN Cause, MME Address for Control Plane, Target to Source Transparent Container, Address(es) and TEID(s) for Data Forwarding).

2-10. If indirect forwarding applies, the AMF forwards to the PGW-C+SMF the information related to data forwarding to the SGW. The PGW-C+SMF returns a Create Indirect Data Forwarding Tunnel Response.

2-11. The AMF sends the Handover Command to the source NG-RAN. The source NG-RAN commands the UE to handover to the target access network by sending the HO Command. This message includes a transparent container including radio aspect parameters that the target eNB has set-up in the preparation phase. The UE correlates the ongoing QoS flows with the indicated EPS Bearer IDs to be setup in the HO command. UE locally deletes the QoS flows that do not have an EPS bearer ID assigned.

2-12. When the UE has successfully accessed the target eNodeB, the target eNodeB informs the target MME by sending the message Handover Notify.

2-13. The target MME informs the Serving GW that the MME is responsible for all the bearers the UE have established by sending the Modify Bearer Request message for each PDN connection.

The target MME releases the non-accepted EPS Bearer contexts by triggering the Bearer Context deactivation procedure. If the Serving GW receives a DL packet for a non-accepted bearer, the Serving GW drops the DL packet and does not send a Downlink Data Notification to the SGSN.

2-14. The Serving GW informs the PGW-C+SMF of the relocation by sending the Modify Bearer Request message for each PDN connection. The PGW locally deletes the QoS flows that do not have an EPS bearer ID assigned. Due to the "match all" filter in the default QoS flow, the PGW maps the IP flows of the deleted QoS flows to the default QoS flow.

2-15. The PGW-C+SMF acknowledges the Modify Bearer Request. At this stage the User Plane path is established for the default bearer and the dedicated GBR bearers between the UE, target eNodeB, Serving GW and the PGW+SMF.

2-16. The Serving GW acknowledges the User Plane switch to the MME via the message Modify Bearer Response.

2-17. The PGW-C+SMF initiates dedicated bearer activation procedure for non-GBR QoS flows by mapping the parameters of the non-GBR flows to EPC QoS parameters, 17b. This setup may be triggered by the PCRF+PCF which may also provide the mapped QoS parameters, if PCC is deployed. This procedure is specified in TS 23.401 [13], clause 5.4.1. For Ethernet PDU Session type, using non-IP PDN type in EPS, 17a, this step is not applicable, 17c.

4.11.2.2 EPS to 5GS Handover Using N26 Interface

In FIGS. 6 and 7 aspects of the invention have been illustrated. FIGS. 6 and 7 should be read in conjunction with FIG. 3. Some steps of the prior art methods, in particular those which are identical with embodiments of the invention, have been omitted from FIGS. 6 and 7.

4.11.2.2.1 General

N26 interface is used to provide seamless session continuity for single registration mode. FIG. 3 corresponding to FIG. 4.11.1.2.1-1 describes the handover procedure from EPS to 5GS when N26 is supported.

The procedure involves a handover to 5GS and setup of default and GBR QoS flows in 5GS.

UE has one or more ongoing PDN connections including one or more EPS bearers. During PDN connection establishment, the UE allocates the PDU Session ID and sends it to the PGW-C+SMF via PCO and other 5G parameters corresponding to PDN connection, e.g. Session AMBR and QoS rules, are allocated by the PGW-C+SMF and sent to UE in PCO. During the GBR EPS bearer establishment/modification procedure, QoS rules corresponding to the related EPS bearers are allocated and sent to UE in PCO. The 5G parameters are stored in the UE and are to be used when the UE is handed over from EPS to the 5GS. The 5G QoS parameters may be provided to PGW-C+SMF by the PCF+PCRF, if PCC is deployed.

In case the PDN type of a PDN Connection in EPS is non-IP and is locally associated in UE and SMF to PDU Session type Ethernet or Unstructured, the PDU Session type in 5GS shall be set to Ethernet or Unstructured respectively.

NOTE: Interworking between EPS and 5GS is supported with IP address preservation by assuming SSC mode 1 in this release of the specification.

4.11.2.2.2 Preparation Phase

FIG. 4.11.2.2.2-1 shows the preparation phase of the Single Registration-based Interworking from EPS to 5GS procedure.

This procedure applies to the Non-Roaming (TS 23.501 [2] FIG. 4.3.1-1), Home-routed roaming (TS 23.501 [2] FIG. 4.3.2-1) and Local Breakout roaming Local Breakout (TS 23.501 [2] FIG. 4.3.2-2) cases.

For non-roaming scenario, v-SMF, v-UPF and v-PCF+v-PCRF are not present

For home-routed roaming scenario, the SMF+PGW-C and UPF+PGW-U are in the HPLMN. v-PCF+v-PCRF are not present For local breakout roaming scenario, v-SMF and v-UPF are not present. SMF+PGW-C and UPF+PGW-U are in the VPLMN.

In local-breakout roaming case, the v-PCF+v-PCRF forwards messages between the SMF+PGW-C and the h-PCF+h-PCRF.

3-1. The source E-UTRAN decides that the UE should be handed over to the NG-RAN.

3-2. The E-UTRAN sends a Handover Required (Target NG-RAN Node ID, Source to Target Transparent Container) message to the MME.

3-3. The MME selects the target AMF and sends a Forward Relocation Request (Target NG-RAN Node ID, Source to Target Transparent Container, EPS MM Context, EPS Bearer Context(s)) message to the selected AMF.

The AMF converts the received EPS MM Context into the 5GS MM Context. The MME UE context includes IMSI, ME Identity, UE security context, UE Network Capability, and EPS Bearer context(s). An EPS Bearer context includes the common SMF+PGW-C address and V-CN Tunnel Info at the UPF+PGW-U for uplink traffic, and APN.

3-4. The AMF sends a PDU Handover Request (PDN Connection, AMF ID) message to the selected SMF. The PDN Connection provides the common SMF+PGW-C address.

For home-routed roaming scenario, the v-SMF selects the SMF+PGW-C using the PDN Connection.

3-5. If dynamic PCC is deployed, the SMF may initiate PDU Session Modification towards the h-PCF+h-PCRF to obtain the 5GS PCC Rules for the PDU Session. The h-PCF+h-PCRF does not apply the 5GS PCC Rules for the PDU Session.

3-6. The SMF+PGW-C modifies the PGW-U+UPF.

3-7. The SMF+PGW-C sends a PDU Session Modification Response (PDU Session ID, QoS Rules, EPS Bearer Setup List, SSC Mode, H-CN Tunnel-Info) to the AMF.

In case the PDN type of a PDN Connection in EPS is non-IP and is locally associated in UE and SMF to PDU Session type Ethernet or Unstructured, the PDU Session type in 5GS shall be set to Ethernet or Unstructured respectively.

In case of PDU Session type Ethernet, that was using PDN type non-IP in EPS, the SMF creates QoS rules based on the 5GS PCC Rules received from PCF.

3-8. For home-routed roaming scenario only: The v-SMF selects a v-UPF and initiates an N4 Session Establishment procedure with the selected v-UPF. The v-SMF provides the v-UPF with packet detection, enforcement and reporting rules to be installed on the UPF for this PDU Session, including H-CN Tunnel Info. If CN Tunnel Info is allocated by the SMF, the V-CN Tunnel Info is provided to the v-UPF in this step.

The v-UPF acknowledges by sending an N4 Session Establishment Response message. If CN Tunnel Info is allocated by the UPF, the V-CN Tunnel info is provided to the v-SMF in this step.

3-9. The AMF sends a Handover Request (Source to Target Transparent Container, N2 SM Information (PDU Session ID, QoS Profile(s), V-CN Tunnel Info)) message to the NG-RAN.

3-10. The NG-RAN sends a Handover Request Acknowledge (Target to Source Transparent Container, N2 SM response (PDU Session ID, list of accepted QoS flows and (R)AN Tunnel Info), N2 SM Information for PDU Forwarding (PDU Session ID, N3 Tunnel Info for PDU Forwarding)) message to the AMF.

3-11. The AMF sends a Modify PDU Session Request (PDU Session ID, N2 SM response (list of accepted QoS flows and (R)AN Tunnel Info), (N2 SM Information for PDU Forwarding (PDU Session ID, N3 Tunnel Info for PDU Forwarding)) message to the SMF for updating N3 tunnel information.

3-12. SMF+PGW-C to AMF: Modify PDU Response (PDU Session ID, EPS Bearer Setup List).

This message is sent for each received Modify PDU Request message.

SMF+PGW-C performs preparations for N2 Handover by indicating N3 UP address and Tunnel ID of NG-RAN to the UPF if N2 Handover is accepted by NG-RAN. If N2 Handover is not accepted by NG-RAN, SMF+PGW-C deallocates N3 UP address and Tunnel ID of the selected UPF.

The EPS Bearer Setup list is a list of EPS bearer Identifiers successfully handover to 5GC, which is generated based on the list of accepted QoS flows.

3-13. If indirect forwarding applies, the MME sends the Create Indirect Data Forwarding Tunnel Request/Response.

3-14. The AMF sends the message Forward Relocation Response (Cause, Target to Source Transparent Container, Serving GW change indication, EPS Bearer Setup List, AMF Tunnel Endpoint Identifier for Control Plane, Addresses and TEIDs). The EPS Bearer Setup list is the combination of EPS Bearer Setup list from different SMF+PGW-C(s).

Figure 8:
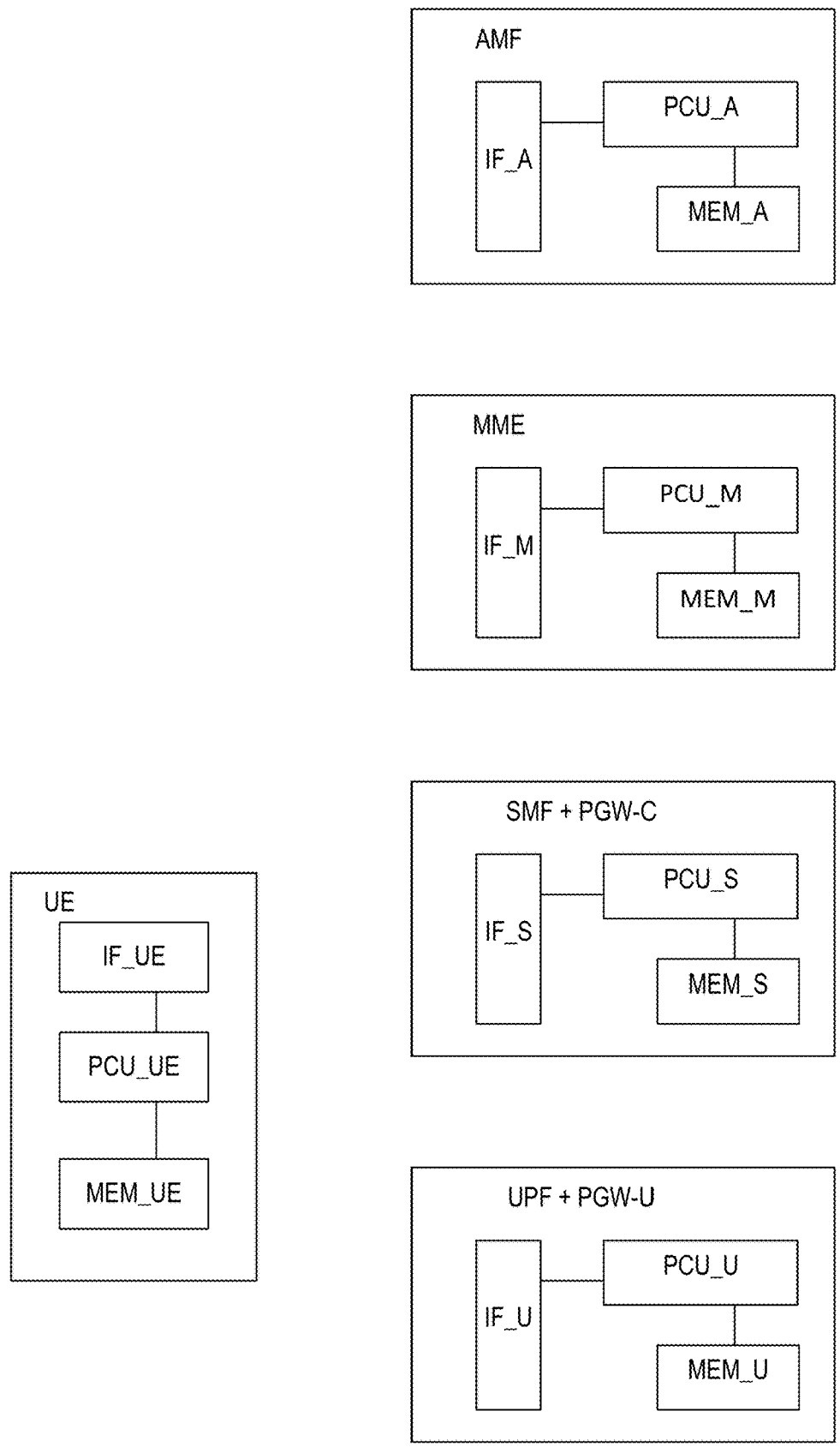
FIG. 8 is an illustration of implementations of embodiments of the invention.

In FIG. 8, further embodiments of the invention are shown.

A user equipment, UE, apparatus according to the invention is illustrated.

The UE comprises processing means comprising an interface IF_UE, memory, MEM_UE, in which memory instructions are stored, and a processor PCU_UE for carrying out the method steps explained above. The UE communicates via the interface IF_UE. The IF_UE comprises both an external interface, communicating with a transmitter and receiver, and internal interfaces (not shown).

In FIG. 8, there is moreover shown a AMF comprising processing means comprising a processor PCU_A, an interface IF_A; and a memory, MEM_A. Instructions are stored in the memory for being performed by the processor such that the method steps explained above are carried out and signalling is communicated on the interface.

In FIG. 8, there is moreover shown a MME comprising processing means comprising a processor PCU_M, an interface IF_M; and a memory, MEM_M. Instructions are stored in the memory for being performed by the processor such that the method steps explained above are carried out and signalling is communicated on the interface.

In FIG. 8, there is also shown a SMF and PGW-C entity comprising processing means comprising a processor PCU_S, an interface IF_S; and a memory, MEM_S. Instructions are stored in the memory for being performed by the processor such that the method steps explained above are carried out and signalling is communicated on the interface.

Finally, a UPF+PGW-U comprising processing means comprising a processor PCU_U an interface IF_U; and a memory, MEM_U, is shown. Instructions are stored in the memory for being performed by the processor such that the method steps explained above are carried out and such that corresponding signalling is effectuated on the interface.

The methods discussed above may alternatively be implemented by means of a system based on network functions virtualization. In FIG. 9, further embodiments of the invention are implemented by means of such a network function virtualization system, NFVS, formed on e.g. general-purpose servers, standard storage and switches. The NFVS may be arranged along the lines described in FIG. 4, ETSI GS NFV 002 V. 1.1.1 (2013-10) and comprises the following elements: A NFV management and orchestration system comprising an Orchestrator, ORCH, a VNF manager, VNF_MGR, and a virtualised Infrastructure manager, VIRT_INFRA. The NFVS more-over comprises an operational/business support system, OP/BUSS_SUPP_SYST, a number of virtual network function instances, VNF, by which the method steps explained above are instantiated, and a virtualised infrastructure, VIRT_INFRA. The VIRT_INFRA comprises a virtual computing, VIRT_COMP, virtual network; VIRT_NETW, and virtual memory, VIRT_MEM, a virtualisation layer, VIRT_LAYER, (e.g. hypervisor) and shared hardware resources, SHARED_HARDW_RES comprising computing devices, COMP, network devices, NETW, comprising e.g. standard switches and other network devices, and standard data storage devices, MEM.

Some notions are explained in the following table comparing 5GS with EPS. In 5GS, PDU sessions are defined which corresponds to the notion PDN connection in EPS. In both systems IP type IPv4 and IPv6 are used. In 5GS a, according to embodiments of the invention, session types Unstructured and Ethernet in 5GS are mapped to the non-IP type in EPS if existing. However, not all EPC systems, in particular the MME, have the capability to support the non-IP type.

| 5G-5GC | 4G-EPC |
| --- | --- |
| PDU session | PDN connection |
| IP type (IPv4/IPv6) | IP type (IPv4/IPv6) |
| Unstructured | non-IP type (if supported) |
| Ethernet | non-IP type (if supported) |

Further Embodiments

An Access and Mobility Management Function, AMF, adapted for taking part in handover from a 5G system, 5GS, to an Evolved Packet System, EPS, in cases where an interface between a Mobility Management Entity, MME, of the EPS and the AMF is provided,
  the AMF being adapted for communicating with a Session Management Function and Packet Data Network, PDN, Gateway—Control plane, SMF and PGW-C, entity, the AMF being adapted for
    requesting in a request the SMF and PGW-C entity to provide a SM, Session Management, Context that also includes mapped EPS, Bearer Contexts;
    wherein for PDU Sessions with PDU Session type Ethernet or Unstructured, providing a target MME capability to the SMF and PGW-C entity in the request to allow the SMF and PGW-C entity to determine whether to include EPS Bearer context for non-IP PDN type or not.

The AMF may further be adapted for
  upon receiving Handover Required from a next generation Radio Access Node, NG RAN;
  selecting an MME.

A Session Management Function and Packet Data Network Gateway—Control plane and Session Management Function, SMF and PGW-C, entity, adapted for taking part in handover from a 5G system, 5GS, to an Evolved Packet System, EPS, in cases where an interface between a Mobility Management Entity, MME, of the EPS and an Access and Mobility Management Function, AMF, of the 5GS is provided, comprising
  receiving a Context Request;
  creating a SM Context for non-IP PDN type or not;
  transmit a Context Response to AMF.

The SMF may further comprise
  upon determining an Ethernet PDU session type, using non-IP PDN type in EPS;
  omitting initiating a dedicated bearer activation procedure for non-GBR, Guaranteed Bit Rate, QoS, Quality of Service, flows by mapping the parameters of the non-GBR flows to EPC QoS parameters.

A Session Management Function and Packet Data Network, PDN, Gateway—Control plane and Session Management Function, SMF and PGW-C, adapted for taking part in handover from an Evolved Packet System, EPS to a 5G system, 5GS, in cases where an interface between an Access and Mobility Management Function, AMF, and the SMF and PGW-C entity is provided, comprising
  upon a positive determination that a PDN connection in EPS is NON-IP and SMF to PDU session type Ethernet, setting session type in 5GS to Ethernet;
  upon a negative determination that a PDN connection in EPS is NON-IP and SMF to PDU session type Ethernet, setting session type in 5GS to unstructured.

The interface between the MME and the AMF may be an N26 interface.

Still Further Embodiments

In conclusion there is provided a system comprising an Access and Mobility Management Function, AMF, adapted for taking part in handover from a 5G system, 5GS, to an Evolved Packet System, EPS, an interface being provided between a Mobility Management Entity, MME, of the EPS and the AMF, the system moreover comprising a Session Management Function and Packet Data Network (PDN) Gateway—Control plane and Session Management Function, SMF and PGW-C, entity.

The AMF is being adapted for signalling with a Session Management Function and Packet Data Network, PDN, Gateway—Control plane, SMF and PGW-C, entity.

The AMF is being further adapted for—providing a request 102d, 2-2a to the SMF and PGW-C entity to provide a Session Management, SM, Context that also includes mapped EPS, Bearer Contexts 102d; —wherein for PDU Sessions with PDU Session type Ethernet or Unstructured, providing 102e1 a capability of a target MME of supporting a Non-IP PDN type to the PGW-C and SMF entity in the request 2-2a to allow the PGW-C and SMF entity to determine whether or not to include an EPS Bearer context for non-IP PDN type—transmitting the request 2-2a to the SMF.

The SMF and PGW-C entity being adapted for—receiving a Context Request 2-2a; 102e2; —for PDU sessions with PDU Session type Ethernet or Unstructured, determining 102e3 to include an EPS Bearer context for non-IP PDN type and creating 102e3 a Session Management, SM, Context; —transmitting 102e4 a Context Response to the AMF 2-2b with the SM Context.

There is also provided an Access and Mobility Management Function, AMF, adapted for taking part in handover from a 5G system, 5GS, to an Evolved Packet System, EPS, an interface being provided between a Mobility Management Entity, MME, of the EPS and the AMF.

The AMF being adapted for signalling with a Session Management Function and Packet Data Network, PDN, Gateway—Control plane, SMF and PGW-C, entity, the AMF being adapted for providing a request 102d, 2-2a to the SMF and PGW-C entity to provide a Session Management, SM, Context that also includes mapped EPS, Bearer Contexts 102d; —wherein for PDU Sessions with PDU Session type Ethernet or Unstructured, providing 102e1 a capability of a target MME of supporting a Non-IP PDN type to the PGW-C and SMF entity in the request 2-2a to allow the PGW-C and SMF entity to determine whether or not to include an EPS Bearer context for non-IP PDN type; —transmitting the request 2-2a to the SMF.

The AMF may further be adapted for signalling with a Next Generation Radio Access Node, NG-RAN, and—upon receiving 101 a Handover Required 2-1 from the NG RAN; —determining 102a from a target eNodeB identifier that the type of handover is to E-UTRAN, also denoted EPS, —selecting 102b, 2-2 an MME.

The AMF may be configured with a Dedicated Core Network Identity, DCN ID, per Data Network Name, DNN. For the selection 102b of the MME, the AMF may utilize 102c a DCN ID for the DNN or DNNs that have active Session Management, SM, contexts in the AMF, e.g. in order to select an MME that have Cellular Internet of Things, CIoT, Optimization support for non-IP PDN type.

The request 2-2a may be a Session Management, SM, Request 2-2a.

There is also provided a Session Management Function and Packet Data Network PDN Gateway—Control plane and Session Management Function, SMF and PGW-C, entity, adapted for taking part in handover from a 5G system, 5GS, to an Evolved Packet System, EPS, an interface being provided between a Mobility Management Entity, MME, of the EPS, and an Access and Mobility Management Function, AMF, of the 5GS, the SMF and PGW-C entity being adapted for—receiving a Context Request 2-2a; 102e2; —for PDU sessions with PDU Session type Ethernet or Unstructured, determining 102e3 to include an EPS Bearer context for non-IP PDN type and creating 102e3 a Session Management, SM, Context; —transmitting 102e4 a Context Response to the AMF 2-2b with the SM Context.

The SMF and PGW-C, entity may—for PDU sessions with PDU Session type IPv4/IPv6, determining 102e3 to include an EPS Bearer context with PDN type IPv4/IPv6.

The SMF and PGW-C entity may further comprise—upon determining 17a an—Ethernet PDU session type, using non-IP PDN type in EPS; —omitting 17c initiating 17b a dedicated bearer activation procedure for non-GBR, Guaranteed Bit Rate, QoS, Quality of Service, flows by mapping the parameters of the non-GBR flows to EPC QoS parameters.

The SMF and PGW-C entity may further comprise—upon determining 17a PDU session type IPv4/IPv6, using PDN type IPv4/IPv6 in EPS; —initiating 17b a dedicated bearer activation procedure 17b for non-GBR, Guaranteed Bit Rate, QoS, Quality of Service, flows by mapping the parameters of the non-GBR flows to EPC QoS parameters.

There is also provided a Session Management Function and Packet Data Network, PDN, Gateway—Control plane and Session Management Function, SMF and PGW-C entity, adapted for taking part in handover from an Evolved Packet System, EPS to a 5G system, 5GS, in cases where an interface between an Access and Mobility Management Function, AMF, and the SMF and PGW-C entity is provided, comprising—determining 7a whether—PDN connection in EPS is NON-IP and is locally associated in SMF to PDU session type Ethernet or Unstructured; —upon a positive determination 7a that a PDN connection in EPS is NON-IP and is locally associated in SMF to PDU session type Ethernet, setting session type in 5GS to Ethernet 7b; —upon a negative determination 7a that a PDN connection in EPS is NON-IP and is locally associated in SMF to PDU session type Unstructured, setting session type in 5GS to Unstructured 7d.

The interface between the MME and the AMF may be an N26 interface according to further embodiments of the invention.

There are furthermore provided respective methods such as a Method for an Access and Mobility Management Function, AMF, adapted for taking part in handover from a 5G system, 5GS, to an Evolved Packet System, EPS, an interface being provided between a Mobility Management Entity, MME, of the EPS and the AMF, the AMF being adapted for signalling with a Session Management Function and Packet Data Network, PDN, Gateway—Control plane, SMF and PGW-C, entity, the AMF being adapted for— providing a request 102d, 2-2a to the SMF and PGW-C entity to provide a Session Management, SM, Context that also includes mapped EPS, Bearer Contexts 102d; —wherein for PDU Sessions with PDU Session type Ethernet or Unstructured, providing 102e1 a capability of a target MME of supporting a Non-IP PDN type to the PGW-C and SMF entity in the request 2-2a to allow the PGW-C and SMF entity to determine whether or not to include an EPS Bearer context for non-IP PDN type—transmitting the request 2-2a to the SMF.

The AMF being adapted for signalling with a Next Generation Radio Access Node, NG-RAN, the method may further comprise—upon receiving 101 a Handover Required 2-1 from the NG RAN; —determining 102a from a target eNodeB identifier that the type of handover is to E-UTRAN, also denoted EPS, —selecting 102b, 2-2 an MME.

The AMF may be configured with a Dedicated Core Network Identity, DCN ID, per Data Network Name, DNN, and wherein for the selection 102b of the MME, the method comprising the AMF utilizing 102c a DCN ID for the DNN or DNNs that have active Session Management, SM, contexts in the AMF, e.g. in order to select an MME that have Cellular Internet of Things, CIoT, Optimization support for non-IP PDN type.

There is also provided a method for a Session Management Function and Packet Data Network PDN Gateway—Control plane and Session Management Function, SMF and PGW-C, entity, adapted for taking part in handover from a 5G system, 5GS, to an Evolved Packet System, EPS, an interface being provided between a Mobility Management Entity, MME, of the EPS, and an Access and Mobility Management Function, AMF, of the 5GS, the SMF and PGW-C entity being adapted for—receiving a Context Request 2-2a; 102e2; for PDU sessions with PDU Session type Ethernet or Unstructured, determining 102e3 to include an EPS Bearer context for non-IP PDN type and creating 102e3 a Session Management, SM, Context; —transmitting 102e4 a Context Response to the AMF 2-2b with the SM Context.

For PDU sessions with PDU Session type IPv4/IPv6, the method for the SMF and PGW-C, entity may comprise the step of determining 102e3 to include an EPS Bearer context with PDN type IPv4/IPv6.

The above Method may further comprise—upon determining 17a an—Ethernet PDU session type, using non-IP PDN type in EPS; —omitting 17c initiating 17b a dedicated bearer activation procedure for non-GBR, Guaranteed Bit Rate, QoS, Quality of Service, flows by mapping the parameters of the non-GBR flows to EPC QoS parameters.

The above Method may further comprise—upon determining 17a PDU session type IPv4/IPv6, using PDN type IPv4/IPv6 in EPS; —initiating 17b a dedicated bearer activation procedure 17b for non-GBR, Guaranteed Bit Rate, QoS, Quality of Service, flows by mapping the parameters of the non-GBR flows to EPC QoS parameters.

There is also provided a Method for a Session Management Function and Packet Data Network, PDN, Gateway—Control plane and Session Management Function, SMF and PGW-C entity, adapted for taking part in handover from an Evolved Packet System, EPS to a 5G system, 5GS, in cases where an interface between an Access and Mobility Management Function, AMF, and the SMF and PGW-C entity is provided, comprising—determining 7a whether—PDN connection in EPS is NON-IP and is locally associated in SMF to PDU session type Ethernet or Unstructured; —upon a positive determination 7a that a PDN connection in EPS is NON-IP and is locally associated in SMF to PDU session type Ethernet, setting session type in 5GS to Ethernet 7b; —upon a negative determination 7a that a PDN connection in EPS is NON-IP and is locally associated in SMF to PDU session type Unstructured, setting session type in 5GS to Unstructured 7d.

Finally, a program or computer program product adapted for carrying out the steps above is provided according to an embodiment of the invention.

The invention claimed is:

1. An Access and Mobility Management Function (AMF) adapted for taking part in a handover of Protocol Data Unit (PDU) sessions from a 5G system (5GS) to an Evolved Packet System (EPS), wherein an Unstructured PDU session type is mapped to a non-IP Packet Data Network (PDN) type, and the AMF is adapted for signaling with a Session Management Function and Packet Data Network Gateway Control plane (SMF and PGW-C) entity, the AMF being further adapted to:
generate a request for transmission to the SMF and PGW-C entity, wherein the request comprises capability information indicating whether a target Mobility Management Entity (MME) supports the non-IP PDN type to allow the SMF and PGW-C entity to determine whether or not to include an EPS Bearer context for non-IP PDN type; and
transmit the generated request to the SMF and PGW-C entity.

2. The AMF of claim 1, wherein the AMF is further adapted such that, upon receiving a Handover Required message from a Next Generation Radio Access Node (NG-RAN), the AMF:
determines from a target eNodeB identifier included in the Handover Required message that the type of handover is to E-UTRAN; and
selects the target MME.

3. The AMF of claim 1, wherein
the AMF is configured with a Dedicated Core Network Identity (DCN ID) per Data Network Name, (DNN), and
for the selection of the target MME, the AMF utilizes a DCN ID for the DNN or DNNs that have active Session Management (SM) contexts in the AMF.

4. The AMF of claim 1, wherein the request is a Session Management Request.

5. A method performed by an Access and Mobility Management Function (AMF) taking part in a handover from a 5G system to an Evolved Packet System (EPS), the method comprising:
generating a request for transmission to a Session Management Function and Packet Data Network Gateway Control plane (SMF and PGW-C) entity, wherein the request includes capability information indicating whether a target Mobility Management Entity (MME) supports a non-IP PDN type to allow the SMF and PGW-C entity to determine whether or not to include an EPS Bearer context for non-IP PDN type; and
transmitting the request to the SMF and PGW-C entity.

6. The method of claim 5, further comprising:
after receiving a Handover Required message from a Next Generation Radio Access Node (NG RAN), determining from a target eNodeB identifier included in the Handover Required message that the type of handover is to E-UTRAN, and
selecting the target MME.

7. The method of claim 6, wherein
the AMF is configured with a Dedicated Core Network Identity (DCN ID) per Data Network Name (DNN), and
for the selection of the target MME, the method comprises the AMF utilizing a DCN ID for the DNN or DNNs that have active Session Management contexts in the AMF, in order to select an MME that has Cellular Internet of Things Optimization support for non-IP PDN type.

8. The method of claim 5, wherein the request is a Session Management Request.

* * * * *

UNITED STATES PATENT AND TRADEMARK OFFICE
CERTIFICATE OF CORRECTION

PATENT NO. : 11,849,364 B2
APPLICATION NO. : 17/821838
DATED : December 19, 2023
INVENTOR(S) : Rommer et al.

Page 1 of 2

It is certified that error appears in the above-identified patent and that said Letters Patent is hereby corrected as shown below:

On the Title Page

On Page 2, in Item (56), under "OTHER PUBLICATIONS", in Column 2, Line 30, delete "pages). cited by applicant." and insert -- pages). --, therefor.

In the Drawings

In Fig. 4, Sheet 4 of 7, and on the Title Page, the illustrative figure, for Tag "102b.", Line 2, delete "DECRIBED" and insert -- DESCRIBED --, therefor.

In Fig. 4, Sheet 4 of 7, and on the Title Page, the illustrative figure, for Tag "102C.", Line 1, delete "102C. SELECTION UTILIZE" and insert -- 102c. SELECTION MAY UTILIZE --, therefor.

In Fig. 4, Sheet 4 of 7, and on the Title Page, the illustrative figure, for Tag "102e1.", Line 9, delete "INCLUDED" and insert -- INCLUDE --, therefor.

In the Specification

In Column 1, Line 7, delete "2020 (status pending)," and insert -- 2020, now U.S. Pat. No. 11,432,215, --, therefor.

In Column 1, Line 10, delete "US." and insert -- U.S. --, therefor.

In Column 3, Line 63, delete "which" and insert -- to which --, therefor.

In Column 3, Line 64, delete "non GBR" and insert -- non-GBR --, therefor.

In Column 3, Line 65, delete "which" and insert -- to which --, therefor.

In Column 3, Line 65, delete "that are" and insert -- are --, therefor.

Signed and Sealed this
Thirtieth Day of April, 2024

Katherine Kelly Vidal
*Director of the United States Patent and Trademark Office*

CERTIFICATE OF CORRECTION (continued)
U.S. Pat. No. 11,849,364 B2

In Column 3, Line 65, delete "to in" and insert -- to --, therefor.

In Column 4, Line 20, delete "E-UT-RAN" and insert -- E-UTRAN --, therefor.

In Column 6, Line 39, delete "an Session" and insert -- a Session --, therefor.

In Column 7, Line 7, delete "achieve" and insert -- to achieve --, therefor.

In Column 10, Line 16, delete "which" and insert -- to which --, therefor.

In Column 10, Line 17, delete "GRB" and insert -- GBR --, therefor.

In Column 10, Line 18, delete "which" and insert -- to which --, therefor.

In Column 14, Line 13, delete "Info)," and insert -- Info)), --, therefor.

In Column 15, Line 19, delete "more-over" and insert -- moreover --, therefor.